United States Patent
Rao et al.

(10) Patent No.: US 12,239,250 B2
(45) Date of Patent: Mar. 4, 2025

(54) SYSTEM AND METHOD FOR MOUNTING WALL HANGINGS

(71) Applicant: TALAYA NORTH AMERICA LLC, Austin, TX (US)

(72) Inventors: Madhavi Kommula Rao, Austin, TX (US); Benjamin Kyle Ericksen, Austin, TX (US)

(73) Assignee: TALAYA NORTH AMERICA LLC, Austin, TX (US)

( * ) Notice: Subject to any disclaimer, the term of this patent is extended or adjusted under 35 U.S.C. 154(b) by 0 days.

(21) Appl. No.: 17/959,789

(22) Filed: Oct. 4, 2022

(65) Prior Publication Data

US 2023/0114635 A1 Apr. 13, 2023

Related U.S. Application Data

(60) Provisional application No. 63/253,668, filed on Oct. 8, 2021.

(51) Int. Cl.
| | |
|---|---|
| A47G 1/17 | (2006.01) |
| B32B 9/02 | (2006.01) |
| B32B 9/04 | (2006.01) |
| B32B 21/13 | (2006.01) |
| B32B 21/14 | (2006.01) |

(52) U.S. Cl.
CPC .............. *A47G 1/17* (2013.01); *B32B 9/02* (2013.01); *B32B 9/042* (2013.01); *B32B 21/13* (2013.01); *B32B 21/14* (2013.01); *B32B 2250/02* (2013.01); *B32B 2451/00* (2013.01)

(58) Field of Classification Search
CPC .. A47G 1/17; B32B 9/02; B32B 9/042; B32B 21/13; B32B 21/14; B32B 2250/02; B32B 2451/00; B32B 2607/02; B32B 3/02; B32B 3/06; E04F 13/0885
USPC ........................................................ 248/544
See application file for complete search history.

(56) References Cited

U.S. PATENT DOCUMENTS

| | | | |
|---|---|---|---|
| 3,987,599 A | 10/1976 | Hines | |
| 4,220,309 A * | 9/1980 | Eisen ..................... | A47G 1/205 248/467 |
| 5,209,449 A * | 5/1993 | Hart ..................... | A47G 1/1606 248/475.1 |
| D398,710 S | 9/1998 | Gonzalez | |
| 5,908,695 A * | 6/1999 | Kobe ..................... | C09J 153/02 428/355 R |
| 6,978,551 B2 * | 12/2005 | Krake ..................... | A47G 1/205 33/669 |
| 7,216,841 B2 * | 5/2007 | Dodig, Jr. ................ | A47G 1/20 248/475.1 |
| 7,276,272 B2 * | 10/2007 | Mizuno .................. | A47G 1/175 428/156 |
| D634,861 S * | 3/2011 | Whittier ....................... | D25/138 |
| 8,065,851 B2 | 11/2011 | Scoville et al. | |
| 8,292,254 B2 | 10/2012 | Groepler | |
| D760,921 S | 7/2016 | Bilge | |
| 9,890,539 B2 | 2/2018 | Tuttle | |
| 9,901,196 B2 | 2/2018 | Azorsky et al. | |
| 10,417,684 B2 | 9/2019 | Pearce et al. | |

(Continued)

*Primary Examiner* — Muhammad Ijaz

(57) ABSTRACT

A system and method enabling a user to removably position and secure reusable, portable, independently hung wall hangings or panels, including wood panels, in any configuration or arrangement desired on a wall surface, which may be removed with limited damage to the wall surface.

21 Claims, 7 Drawing Sheets

(56) References Cited

U.S. PATENT DOCUMENTS

| | | | |
|---|---|---|---|
| 10,441,098 B2* | 10/2019 | Bruno | B25C 3/008 |
| 10,480,198 B2* | 11/2019 | Wang | B32B 27/08 |
| 10,687,638 B1* | 6/2020 | Ghofranian | A47G 1/205 |
| 2017/0202375 A1* | 7/2017 | Fattahi | F16M 11/045 |
| 2019/0116995 A1* | 4/2019 | Udermann | A47G 1/10 |
| 2019/0133347 A1* | 5/2019 | Kirschhoffer | A47G 1/20 |
| 2019/0159610 A1* | 5/2019 | Maynard | A47G 1/1606 |

\* cited by examiner

SYSTEM AND METHOD FOR MOUNTING WALL HANGINGS

CROSS-REFERENCE

This application claims the benefit of U.S. Provisional Patent Application No. 63/253,668 filed Oct. 8, 2021, the entirety of which is incorporated herein by reference.

FIELD

This application relates to a system and method for mounting reusable wall hangings, and specifically to a system including a template and attachments for removably positioning and securing coordinating but independently hung wall hangings, including wood panels, in any configuration desired, while minimizing wall damage.

BACKGROUND

Decorating interior spaces can be an intimidating and expensive project. As consumers spend a considerable amount of time entertaining, working, and relaxing at home, wall hangings and wall decorations in an interior space become important in a number of ways. Consumers want their homes to be inviting, to cultivate a feeling of connection and provide a sense of place and belonging, while at the same time reflecting their individual personality and values. Some consumers may prioritize social and environmental considerations, and desire a space that recognizes current trends and designs. All of this can be particularly difficult in a rental home, such as an apartment, where décor needs may be short term or sufficiently aesthetically and functionally flexible to serve in both the present and potential future spaces, and wall space must be decorated without making move out difficult or causing damage to walls that results in the loss of a security deposit.

In recent years, removable adhesives, such as stretch releasing adhesive strips and double-sided, removable, and/or reusable adhesives have become increasingly popular for mounting wall hangings and decorations in apartments and college dormitories, as the strips are readily removable without causing serious damage to the underlying wall surface. U.S. Pat. Nos. 7,276,272 and 5,908,695, for example, illustrate the commercially available lines of removable adhesive strips or reclosable fasteners offered by the 3M Company, St. Paul, MN, under the brand names COMMAND® or SCOTCH®. Such removable and reclosable adhesive fasteners and related double-sided, removable, and/or reusable adhesives, enable the expansion of a variety of new and creative alternative choices for decorating the walls of interior spaces.

Despite improvements in removable adhesives, there are still difficulties with properly mounting removable, reusable, independently hung wall hangings easily and consistently. Additionally, there is a need for a wall hanging with features providing easy removal in order to limit wall damage during the removal process. The present system and method overcome these difficulties, while at the same time providing creative, flexible, natural, unique and versatile wall hangings.

SUMMARY

A system and method for mounting removable, reusable wall hangings on a wall surface is provided. The design of the present system enables a user to select desired wall panels from a variety of wall panels, boxes or shelves, including light panels or panels with hooks, and preferably composed of or with a surface made of wood. In the preferred embodiment, the wall panel is a solid hardwood or a composite panel, preferably with a decorative wood or natural wood surface of any desired color, character or texture. The wall panels may be provided in a variety of sizes and shapes, such that the user may arrange the selected wall panels in any desired configuration or location on the wall surface. In the illustrated embodiments, a variety of such shapes, sizes and arrangements of wall panels are demonstrated. In one embodiment, the wall panels have a rectangular configuration 7 inches high and 21 inches wide. Each wall panel weighs approximately 2 to 2.25 pounds, and has a thickness of between approximately $\frac{1}{8}^{th}$ inch and 2 inches, and preferably approximately 0.5 inches. Such dimensions provide a unit size that is easy for the user to measure and coordinate with units of other shapes and sizes when creating their desired wall hanging design. In other embodiments, the wall panels may be composite wall panels, having 2 or more layers of different materials to reduce the weight of each panel, or otherwise modify features of the panel, for example, thickness, flexibility or strength.

The wall panels include a front decorative surface and a back attachment surface. The front decorative surface has a desired visual appearance for preferably displaying more than one wall panel on a wall surface. The edges and corners of the back attachment surface of each wall panel are preferably rounded or chamfered to avoid damage to the wall when a wall panel is removed. A rounded-over edge of at least approximately $\frac{1}{8}$-inch radius is preferably provided on all rear edges. The use of a rounded-over edge on the front edges helps to ensure a flush appearance with the other panels on the wall, despite the typical bumps and unevenness in wall surfaces. A rounded-over edge or curved edge is preferably provided on all front edges. In a preferred embodiment, the rounded-over radius is a minimum of between approximately $\frac{1}{4}$ inch and $\frac{1}{32}$ inch.

The use of several different adhesives, fasteners and adhesive/fastener combinations is possible for attachment of the wall panels to the wall surface, in each alternative, using the appropriate weight range for supporting each wall panel. Using commercially available Command®, Scotch® or other "mushroom-head" or interlocking fastener adhesive strips, a removable wall strip is secured to the wall surface in the desired location for supporting the wall panel. A commercially available reclosable, or Velcro® style hook and loop fastener, or double-sided, removable and/or reusable adhesive may alternatively be used.

At least 2 adhesive cutouts are provided on opposite sides of the back attachment surface of each panel, and the cutouts are indented or spaced at least approximately 1 inch from the corners of the back attachment surface, to account for corner shapes and treatments. Panels may be oriented horizontally, vertically, or in any direction the user chooses, and, where possible, each adhesive cutout is aligned to an adjacent panel edge along at least one side so users can easily see and align the fasteners on the panels with the removable adhesive wall fasteners on the wall surface when hanging/mounting the panels. As an example, the adhesive cutouts may be approximately 0.625 inches wide, approximately 0.025 inches deep, approximately 3.0 inches long, and spaced a minimum of approximately 1 inch from the corner of the wall panel. It should be understood that the adhesive cutouts may be configured of any shape and/or size to accommodate commercially available adhesive fasteners.

While at least 2 adhesive cutouts are provided, where a larger and/or heavier panel size is used, 4 or more adhesive cutouts are ideally preferred. Where 4 adhesive cutouts are provided, 2 are provided adjacent one side indented from the corners of the back attachment surface, and 2 more are provided along an opposite side, and may be substantially evenly aligned with the 2 cutouts provided along the one side. Alternatively, the adhesive cutouts may be formed flush with the sides for easier visualization of the adhesive during installation. The wall panel adhesive fastener can be placed either directly on the surface of the panel or within the adhesive cutouts. The adhesive cutouts can have up to a depth sufficient to receive both a wall panel adhesive fastener and a removable wall adhesive fastener substantially within the cutout, meaning the adhesive system or adhesive fasteners have a low profile, such that once the wall panel is attached to the wall, the adhesive fasteners are substantially hidden behind the wall panel.

To engage the removable wall adhesive fastener or wall strip secured to the wall, a mating wall panel adhesive fastener or attachment strip is attached to the wall panel within the adhesive cutouts. Once the mating wall strip and panel attachment strip are engaged together, the wall panel is removably supported on the wall surface in the desired location. Securing the panel attachment strip to the panel may be accomplished in several ways. One alternative is to provide a removable attachment strip for engagement with the removable wall strip. Another alternative is to secure the panel attachment strip with a permanent resin within the adhesive cutouts, such that mating wall panel attachment strips are permanently secured to the wall panels. A still further alternative uses a permanent adhesive strip, but without resin on the wall panel, so that the panel attachment strip on the wall panel is also permanently engaged.

A handle or finger cutout is provided within the back attachment surface of the panel. The cutout, of maximum depth of approximately ¼ inch, minimum width of approximately 1 inch and minimum length of approximately 3.5 inches, where the length of the cutout is aligned along, formed within, an edge of the back attachment surface of the panel, and is provided for receiving an average user's fingers within the cutout during removal of the wall panel from engagement with the wall without compromising the structural integrity of the panel. Lacking a handle cutout, the panel would be difficult to remove by hand, and a user might require a tool or other lever to be placed under the wall panel to pry the wall panel away from the wall during removal. Removal by hand without a handle cutout could cause injury to the user or damage to the wall. The use of a lever or prying tool may likely cause damage to the wall surface.

Once a user determines their desired pattern or arrangement of wall panels to be mounted on the wall, a template is provided to ensure proper placement of the wall strips on the wall surface. The template includes cutouts or openings for placement of a bubble level device, which may also be provided as part of a mounting kit, together with the template, panels and adhesive. Alternatively, the bubble level device used may be a mobile cellular device or smart phone, using a commercially available computer level application for detecting, using the level app, whether the template is horizontally and/or vertically positioned. Adhesive cutouts are also provided within the template for proper placement of the removable adhesive.

To support or assist users in spacing panels at a desired uniform distance from one another, further spacing cutout options may also be provided within the template, or a second spacer template, with a variety of set widths, may be provided as part of the mounting kit. To mount the wall panels, the template is initially placed against the wall in the desired location. The bubble level device is used for necessary adjustments, ensuring the template is level. Once the template is adjusted to a level position, the removable adhesive strips may be placed within the designated adhesive cutouts in the template and secured to the wall surface. Where Command® brand type strips are used, the adhesive strips are secured to the wall surface in the same removal direction, or aligned with, the handle cutout. Using this method, the template is then removed, leaving the adhesive strips secured to the wall surface. Where removable attachment strips are also used on the panels, the mating removable adhesive attachment strips are next placed within the adhesive cutouts of the wall panel. In the case where permanent adhesive attachment strips are used on the panels, the panels are provided to the user with the attachment strips already adhered. The permanent or removable adhesive attachment strips on the wall panel may then be aligned with the adhesive wall strips on the wall surface, and engaged to removably secure the wall panel to the wall surface. The process continues, with the template being placed next to the wall panel mounted on the wall surface, or in the next desired location, and another wall panel is mounted using these same steps, or with the assistance of the additional cutouts or second spacer template to support desired spacing. As shown in the illustrated embodiments, a variety of patterns may be used, including for general wall decoration, as a headboard adjacent a mattress, television screen surround or other wall enhancements.

To remove the wall panel, either when moving, when a new wall hanging design is desired, in the event mistakes are made, or if a preferred design is discovered during the creative mounting process, the wall panel may be readily removed by placing the user's fingers within the finger cutout and gently pulling or peeling the wall panel away from the adhesive applied to the wall surface adjacent the finger cutout. Using the other hand to push down on the opposite edge of the wall panel to create a fulcrum action and/or positioning the user's body relative to the panel in a particular way, for example, standing closer to the handle cutout side of the wall panel, may provide additional ease of removal. The rounded edges and corners provided on the back attachment surface opposite the handle cutout enable the wall panel to roll off the wall, limiting damage to the wall surface. The adhesive on the wall surface is removed using the standard and appropriate technique to avoid damage to the wall.

In a further embodiment of the present system, a wall panel rental program option and/or exchange program is provided, so that users may exchange previously purchased or rented reusable wall panels for alternative wall panels having different shapes, sizes, types of woods, stains, paints, surface textures or other features or treatments to achieve a different desired interior décor, or to coordinate with a new rental space. The user may also return wall panels for recycling or return reusable wall panels for upcycling.

DETAILED DESCRIPTION

Figure 22A:
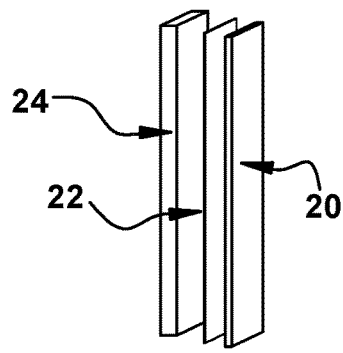
FIG. 22A is a schematic, exploded front perspective view of a composite panel having a back attachment surface formed in a cork material layer, a front decorative surface formed in a thin veneer wood material layer, and a thin adhesive layer attaching the back and front layers together.
Figure 22B:
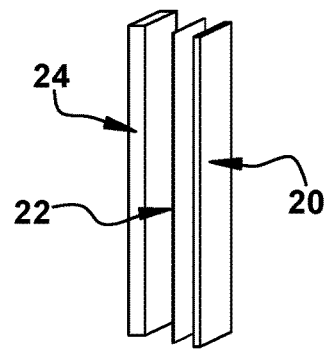
FIG. 22B is a schematic, exploded front perspective view of an alternate composite panel having a back attachment surface formed in a thin wood material layer, a front decorative surface formed in a thin veneer wood or other decorative material layer, and a thin adhesive layer attaching the back and front layers together.
Figure 22C:
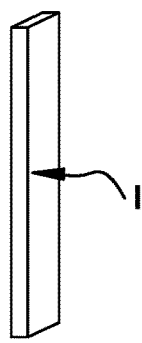
FIG. 22C is a schematic, front perspective view of a solid wood panel embodiment.
Figure 22D:
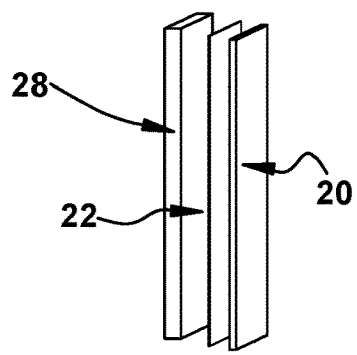
FIG. 22D is a schematic, exploded front perspective view of another alternate composite panel having a back attachment surface formed in a sustainable foam material layer, a front decorative surface formed in a thin veneer wood material layer, and a thin adhesive layer attaching the back and front layers together.

As shown in FIGS. 1 to 4 and 13 to 21, a variety of sizes, shapes and orientations of wall panels may be used with the present system to accomplish any desired visual appearance of a wall hanging arrangement H using the wall panels, a few possible sample alternatives of which are shown in FIGS. 7 to 12. Each of the wall panels includes a front decorative surface F and a back attachment surface B. FIGS. 1 to 4 illustrate that the wall panel 1 may be a solid material, preferably wood, while FIGS. 22A, 22B and 22D illustrate an alternate composite panel. As shown in FIG. 22A, the front decorative surface F is a decorative veneer layer 20, of wood or other desired decorative surface, and may be secured by an adhesive layer 22 to a layer of light weight cork material 24. In FIG. 22B, the front decorative surface F is a decorative veneer layer 20, and may be secured by adhesive 22 to a layer of lighter weight or less expensive wood material 26. In FIG. 22D, a decorative veneer layer 20 may be secured by adhesive 22 to a layer of sustainable foam material 28. Depending on the flexibility of the wood or materials selected for the panel, a second and possibly a third layer of cork, thin wood or foam may be used within the composite panel.

Referring to FIGS. 1 to 4, 6 and 13 to 21, the wall panel 1 includes a back attachment surface B having a recess or adhesive cutout 2 for positioning the adhesive fasteners. Additionally, a recessed handle or finger cutout 3 is also provided in the back attachment surface B. Each of the wall panels 1 also includes a front decorative surface F having a rounded over front edge 4 to ensure an appearance of wall uniformity. The back attachment surface includes a rounded over rear edge 5 to minimize damage to the wall or wall surface W during removal of the reusable wall panel 1.

Figure 6:
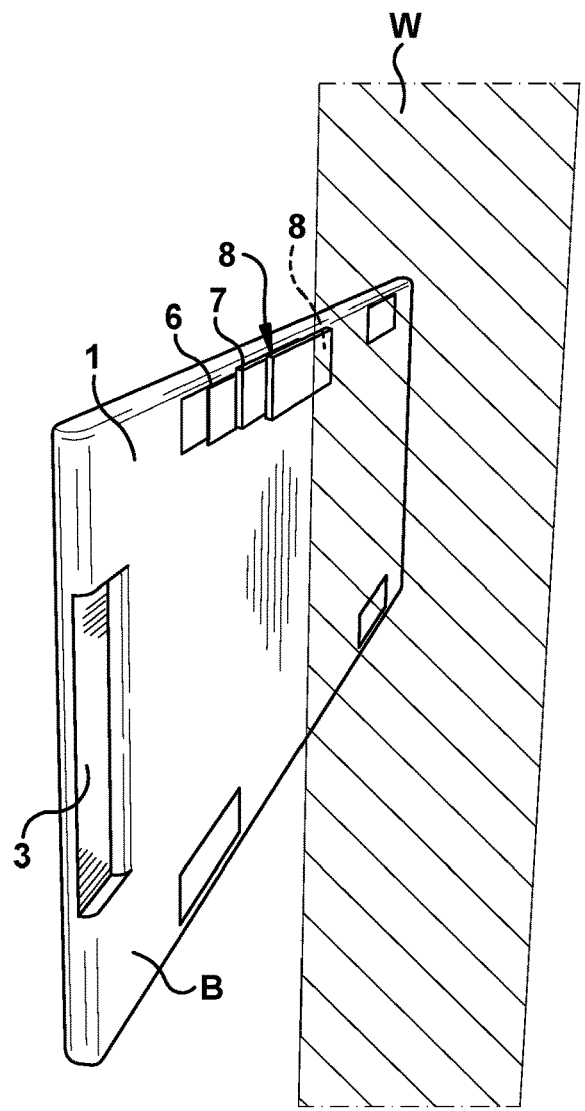
FIG. 6 is a schematic, perspective, right side view of the back attachment surface showing alternate adhesives for use within the adhesive cutouts.
Figure 7:
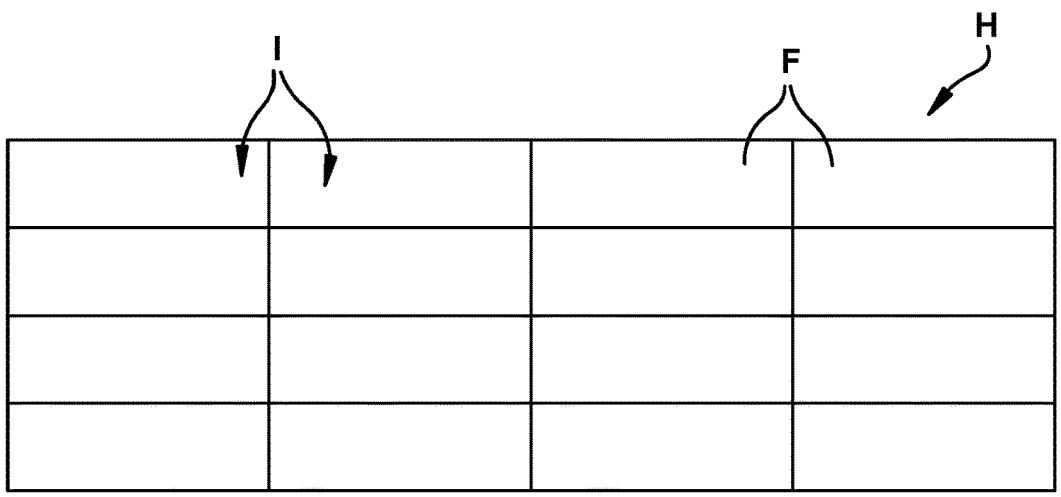
FIG. 7 is a front plan view of one possible arrangement of wood panels mounted to a wall surface using the present system and method.
Figure 8:
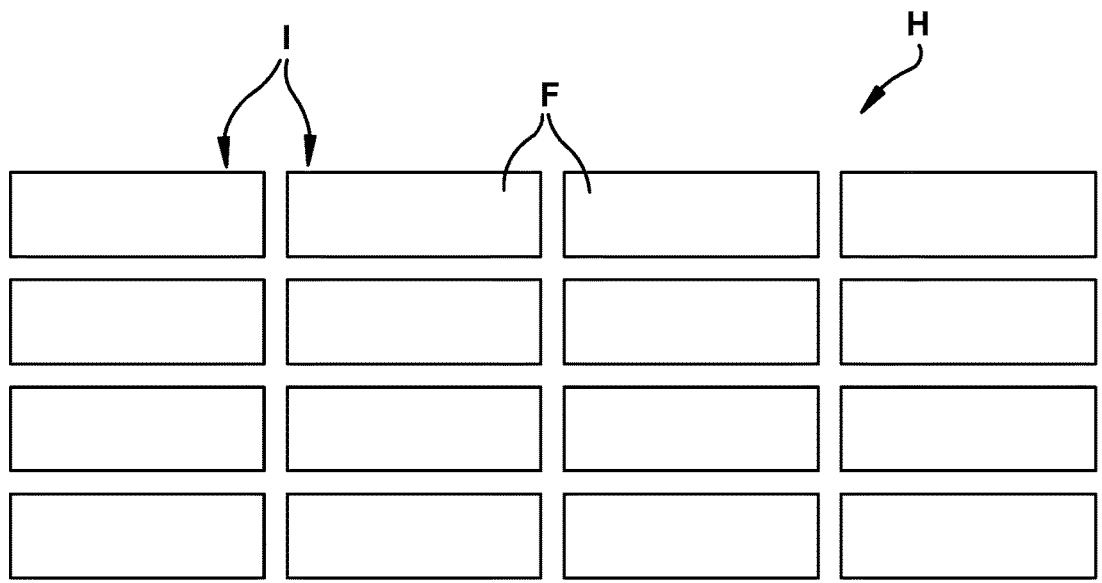
FIG. 8 is a front plan view of another possible arrangement of wood panels mounted to a wall surface using the present system and method.
Figure 9:
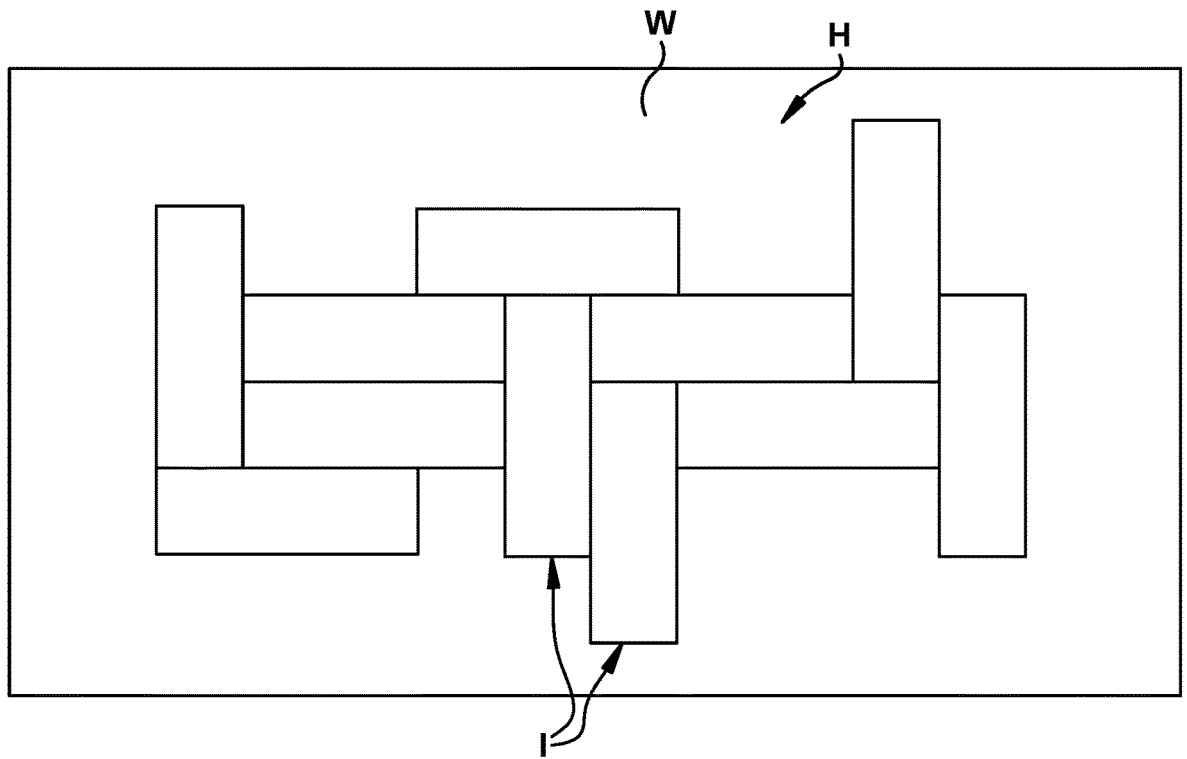
FIG. 9 is a front plan view of still another possible arrangement of wood panels mounted to a wall surface using the present system and method.
Figure 10:
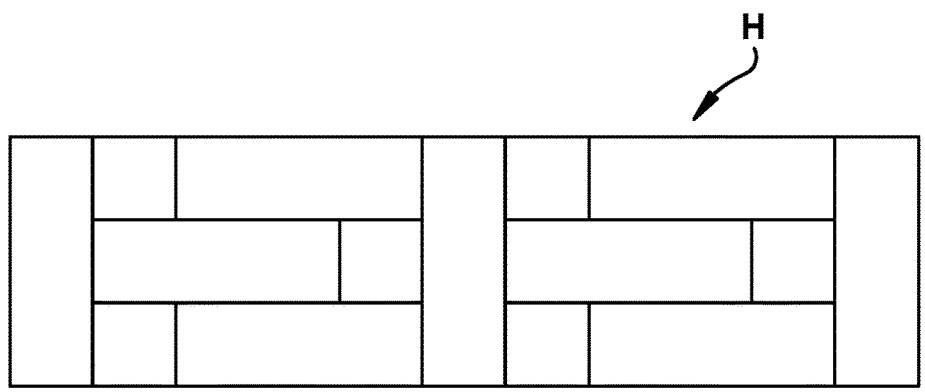
FIG. 10 is another arrangement of mixed panel shapes, including rectangular and square panels mounted to a wall surface using the present system and method.
Figure 11:
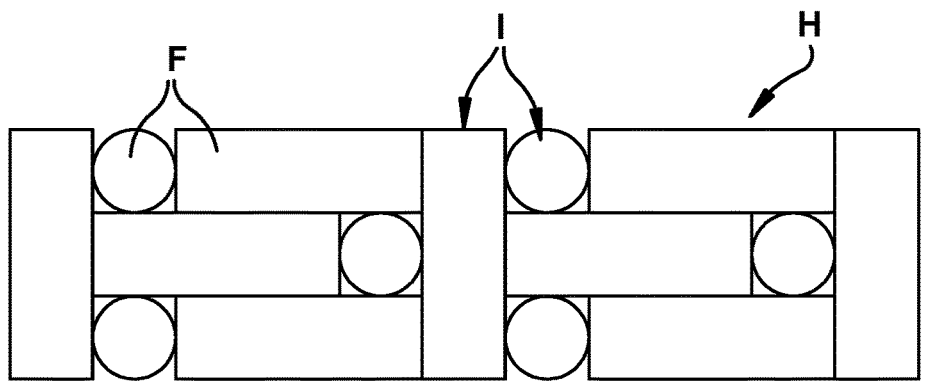
FIG. 11 is another arrangement of mixed panel shapes, including rectangular and circular panels mounted to a wall surface using the present system and method.
Figure 12:
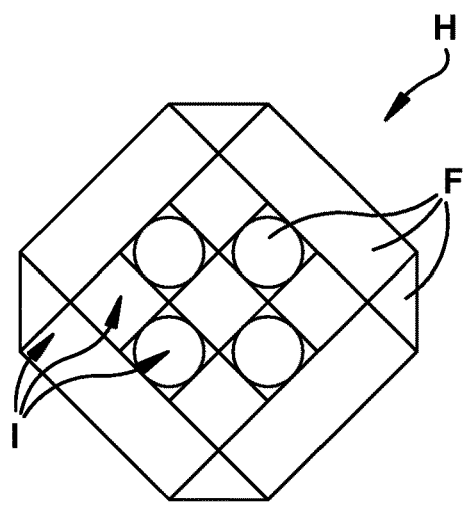
FIG. 12 is yet another arrangement of mixed panel shapes, including rectangular, square, triangular and circular panels mounted to a wall surface using the present system and method.
Figure 13:
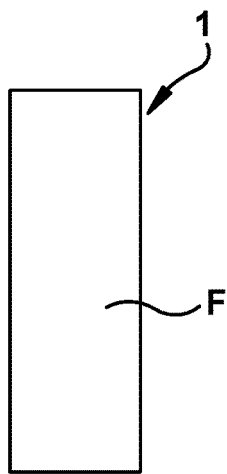
FIG. 13 is a front plan view of a wall panel with another possible mounting orientation.
Figure 14:
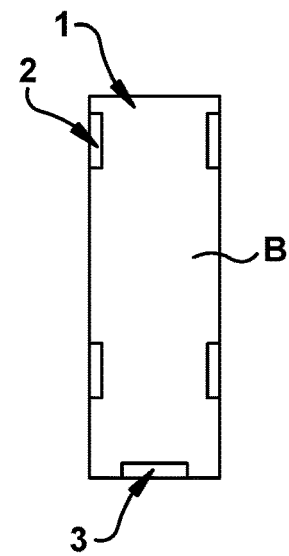
FIG. 14 is a back plan view of the wall panel of FIG. 13.
Figure 15:
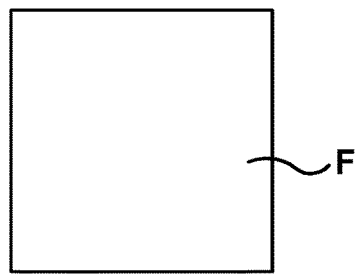
FIG. 15 is a front plan view of a wall panel with an alternative shape.
Figure 16:
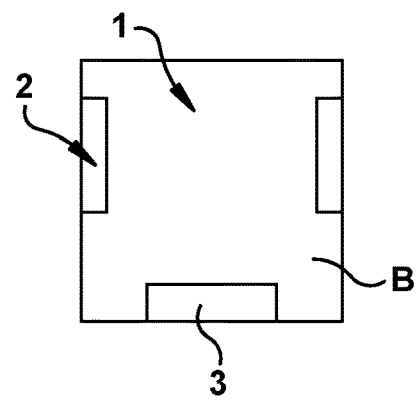
FIG. 16 is a back plan view of the wall panel of FIG. 15.
Figure 17:
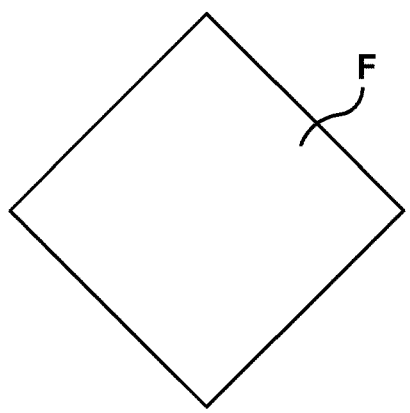
FIG. 17 is a front plan view of the wall panel of FIG. 15 with another one of many alternative mounting orientations.
Figure 18:
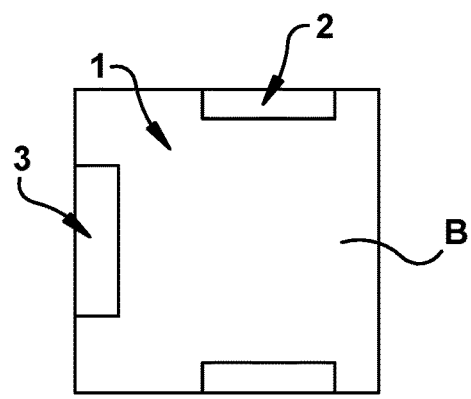
FIG. 18 is a back plan view of the wall panel of FIGS. 15 and 17, but with another one of many alternative mounting orientations.
Figure 19:
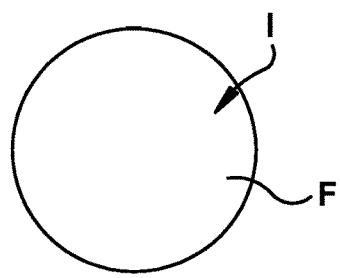
FIG. 19 is a front plan view of a wall panel with an alternative shape.
Figure 20:
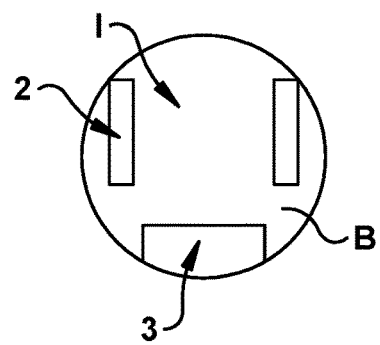
FIG. 20 is a back plan view of the wall panel of FIG. 19.
Figure 21:
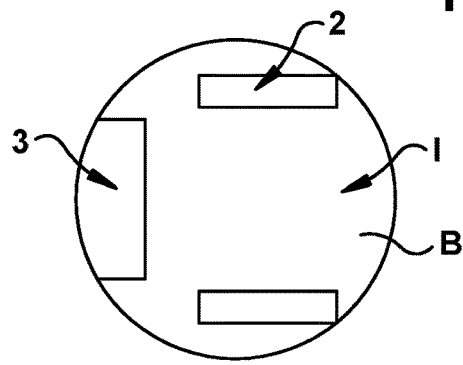
FIG. 21 is a back plan view of the wall panel of FIGS. 19 and 20, but with another one of many alternative mounting orientations.

As shown in FIG. 6, a variety of fastener systems may be used for removably attaching the wall panels 1 to a wall surface W. As previously discussed, a removable wall adhesive fastener or wall strip 8 is secured to the wall W, for removable engagement with a wall panel attachment strip 7. In one embodiment, a resin 6 may be provided within the adhesive cutout 2 to provide a permanent adhesive system, in which the attachment strip or wall panel adhesive fastener 7 is permanently secured to the wall panel 1. As schematically shown in FIG. 6, a 3M Dual Lock® low profile reclosable fastener may be used as one type of an attachment strip 7, and a 3M Command® picture hanging strip 8 may be used as one type of a wall strip 8. The adhesive system may be provided in a variety of different types and combinations, with optional resin adhesive, panel attachment strips 7, and removable wall strips 8.

Figure 1:
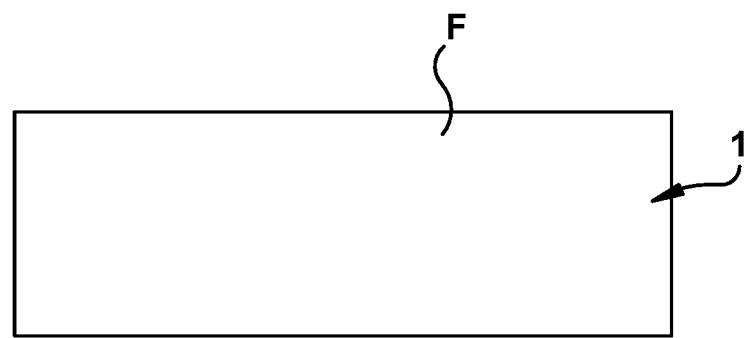
FIG. 1 is a front plan view of a wood wall panel.
Figure 2:
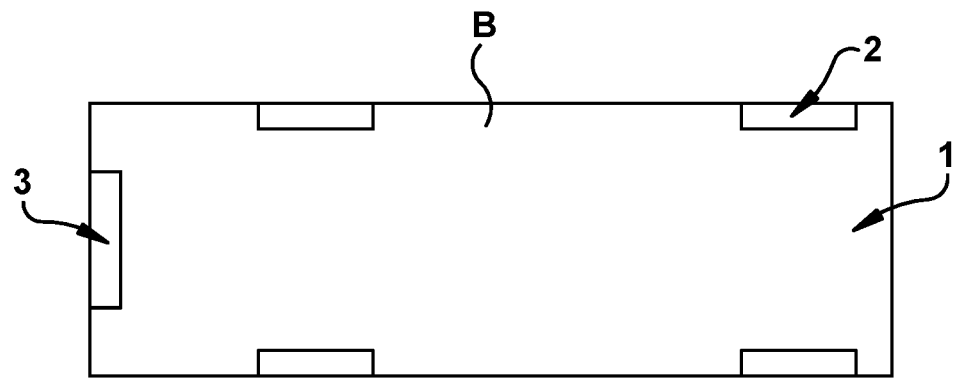
FIG. 2 is a back plan view of the wood wall panel of FIG. 1.
Figure 3:
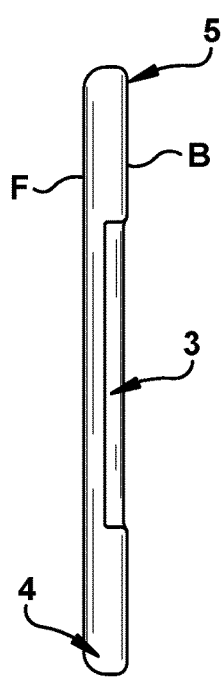
FIG. 3 is a right side view of the wood wall panel of FIG. 1, showing the handle cutout.
Figure 4:
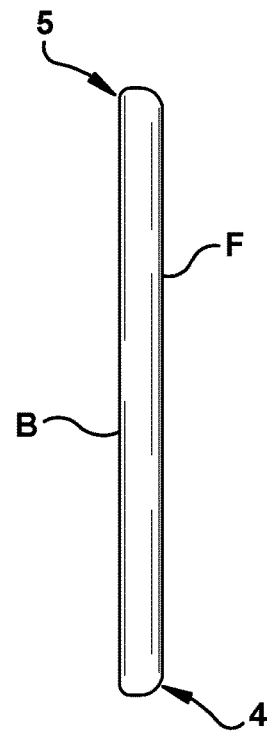
FIG. 4 is a left side view of the wood wall panel of FIG. 1, showing the rounded edges and corners of the back attachment surface.
Figure 5:
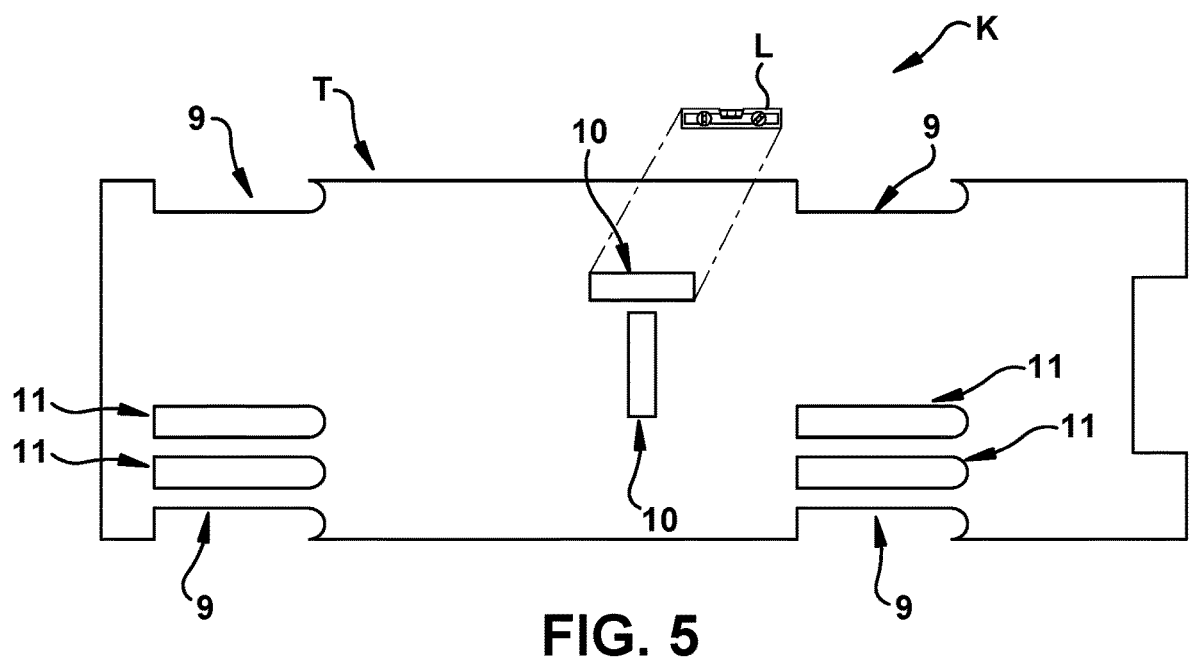
FIG. 5 is a front plan view of the template for mounting wall panels using the present system and method.

FIG. 5 illustrates one embodiment of a template T having cutouts 9, 11 for enabling a user to properly position the removable wall strips 8 for attachment of the wall panels 1 to the wall surface W. A template T is provided with the wall panels 1 as a kit K to enable ease of positioning, and mounting or hanging of the desired arrangement of wall hangings H. Cutouts 10 are used for positioning of a bubble level device L, also included within the kit, to enable leveling of the template T prior to placement of the wall strips 8. Multiple wall strip cutouts 9 are also provided within the template T to position and place the wall strips 8, for example, Command® wall strips. Additional spaced wall strip cutouts 11 are also provided for placement of additional wall strips 8 that may be required depending on the weight of the wall panel 1 being hung on the wall surface W.

The present application provides an improved system and method for mounting wall hangings H. The wall panels 1, template T and level device L with an adhesive fastener system, including wall strips 8 and wall panel attachment strips 7, provide a kit K enabling a user to removably position and secure reusable, portable, independently hung wall hangings, panels and wood panels, in any configuration or arrangement desired on a wall surface W, and/or to remove the panels 1 with limited damage to the wall surface. Users may remove and reposition the wall panels in the event they desire to move the wall panels 1 to a different arrangement during mounting or hanging of the desired wall hanging arrangement H. Additionally, users may, after time, desire to rearrange the wall panels to a different wall hanging arrangement H, or to remove the wall hanging arrangement entirely, all with limited damage to the underlying wall surface W.

While the foregoing system and method for mounting wall panels has been described in relation to certain preferred embodiments, and many details have been set forth for the purpose of illustration, it will be apparent to those skilled in the art that the system and method are susceptible to additional embodiments and that certain of the details described herein can be varied considerably without departing from the basic principles set forth in the following claims.

We claim:

1. A system for mounting wall hangings with attachments for removably positioning and securing independently hung wall hangings, including two or more removable, reusable, independently hung panels, in any configuration desired while minimizing wall damage during removal, the removable, reusable, independently hung panels comprising,
   a front decorative surface having a desired visual appearance, and a back attachment surface,
   the back attachment surface includes at least 2 attachment cutouts positioned parallel to one another and adjacent opposite edges of the removable, reusable, independently hung panels of the wall hanging, for receiving an attachment strip, and a handle cutout positioned adjacent an edge perpendicular to the attachment cutouts, and
   wherein edges and corners of the back attachment surface are rounded to avoid damage to a wall during removal of the removable, independently hung wall hanging.

2. The system of claim 1, wherein the removable, reusable, independently hung panels are reusable in alternate wall hangings.

3. The system of claim 1, wherein at least one removable, reusable, independently hung panel is solid wood.

4. The system of claim 1, wherein at least one removable, reusable, independently hung panel is a composite panel and the front decorative surface is a thin wood veneer layer.

5. The system of claim 1, wherein at least one removable, reusable, independently hung panel is a composite panel having a layer of cork material adhered to a layer of material supporting the front decorative surface.

6. A kit for mounting a wall hanging arrangement comprising,
   a template for determining a desired position for the arrangement of the wall hanging, the template including a cutout for receiving a bubble level device therein,
   removable adhesive wall strips for attachment in desired locations for mounting the wall hanging arrangement determined using adhesive cutouts formed in the template,
   removable, independently hung wall panels, each having a front decorative surface, and a back attachment surface, and wherein edges and corners of the back attachment surface are rounded to avoid damage to the wall during removal, and
   panel attachment strips are secured to the back attachment surface and, where provided as 2-part attachment strips, are positioned for mating attachment to the removable adhesive wall strips.

7. The kit of claim 6, wherein the panels are reusable in alternate wall hanging arrangements.

8. The kit of claim 6, wherein at least one panel is solid wood.

9. The kit of claim 6, wherein at least one panel is a composite panel and the front decorative surface is a thin wood veneer layer.

10. The kit of claim 6, wherein at least one panel is a composite panel having a layer of cork material adhered to a layer of material supporting the front decorative surface.

11. The kit of claim 6, wherein the back attachment surface includes at least 2 cutouts positioned adjacent opposite panel edges for receiving the panel attachment strips, and a handle cutout positioned adjacent an edge perpendicular to the cutouts.

12. The kit of claim 6, further comprising a bubble level device for engagement within the template cutout for receiving the bubble level device.

13. The kit of claim 12, wherein the bubble level device is a level application on a mobile cellular telephone.

14. The kit of claim 6, wherein the panel attachment strips are low profile reclosable fastener strips interlocking stem snap together fastener strips.

15. The kit of claim 6, wherein the removable adhesive wall strips are picture hanging strips or hook and loop or hook and hook interlocking fastener strips.

16. A kit for mounting a wall hanging arrangement comprising,
   a template for determining a desired position for the arrangement of the wall hanging,
   removable adhesive wall strips for attachment in desired locations for mounting the wall hanging arrangement,
   removable, independently hung wall panels, each having a front decorative surface, and a back attachment surface, and wherein edges and corners of the back attachment surface are rounded to avoid damage to the wall during removal, and
   panel attachment strips are secured to the back attachment surface and, where provided as 2-part attachment strips, are positioned for mating attachment to the removable adhesive wall strips.

17. The kit of claim 16, wherein the panels are reusable in alternate wall hanging arrangements.

18. The kit of claim 16, wherein at least one panel is solid wood.

19. The kit of claim 16, wherein at least one panel is a composite panel and the front decorative surface is a thin veneer layer.

20. The kit of claim 16, wherein at least one panel is a composite panel having a layer of cork material adhered to a layer of material supporting the front decorative surface.

21. The kit of claim 16, wherein the back attachment surface includes at least 2 cutouts positioned adjacent opposite panel edges for receiving the panel attachment strips, and a handle cutout positioned adjacent an edge perpendicular to the cutouts.

* * * * *